Feb. 12, 1929.                                                                          1,701,535
L. HOLLAND-LETZ
LUBRICATING DEVICE FOR BEARINGS
Filed April 10, 1924                           2 Sheets-Sheet 1
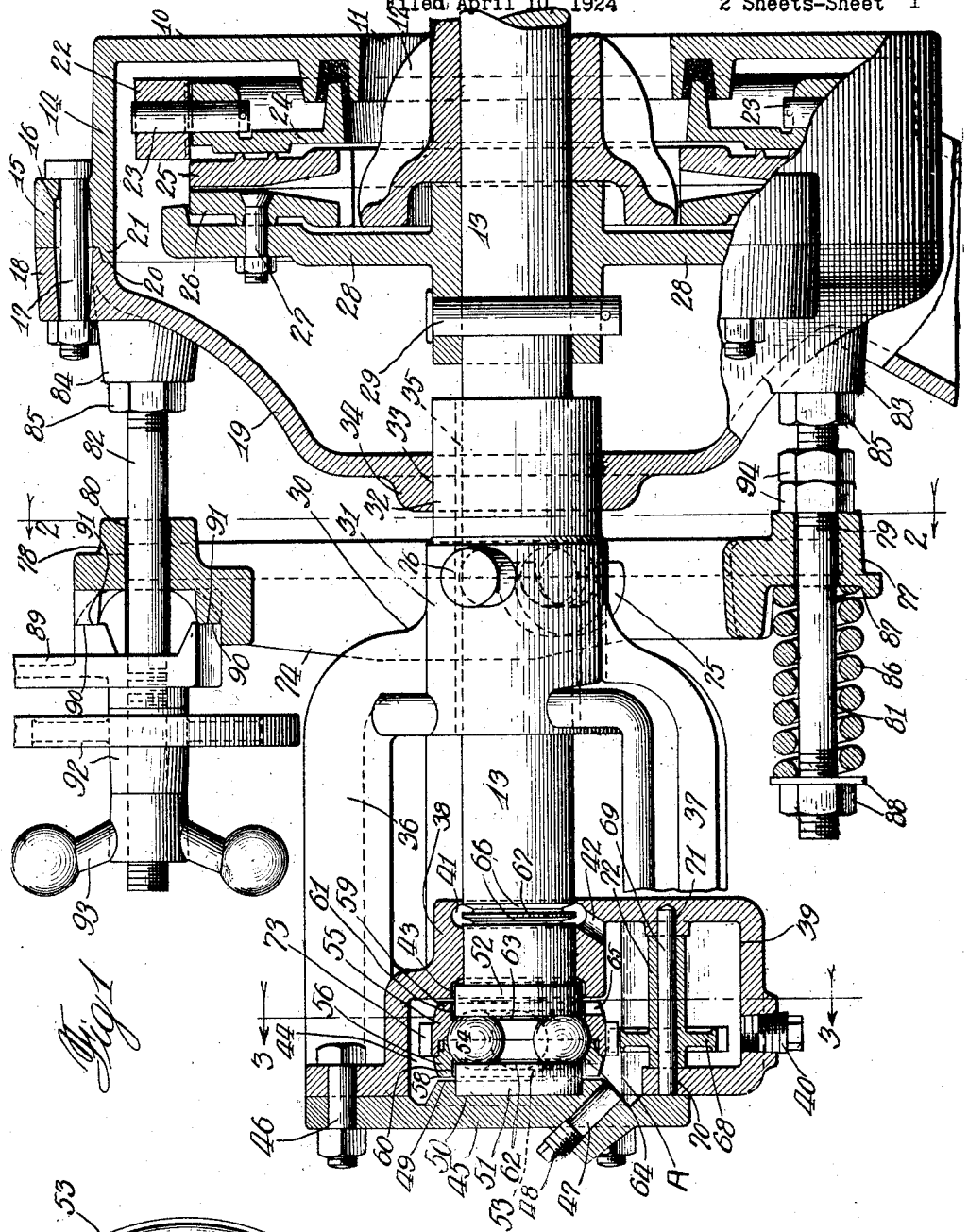
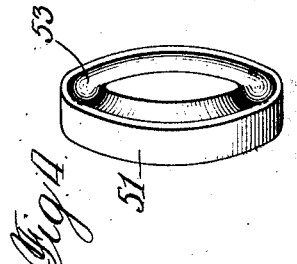
Inventor
Ludwig Holland-Letz
By Sprinkle & Smith
Attys Feb. 12, 1929.  
L. HOLLAND-LETZ  
1,701,535  
LUBRICATING DEVICE FOR BEARINGS  
Filed April 10, 1924   2 Sheets-Sheet 2
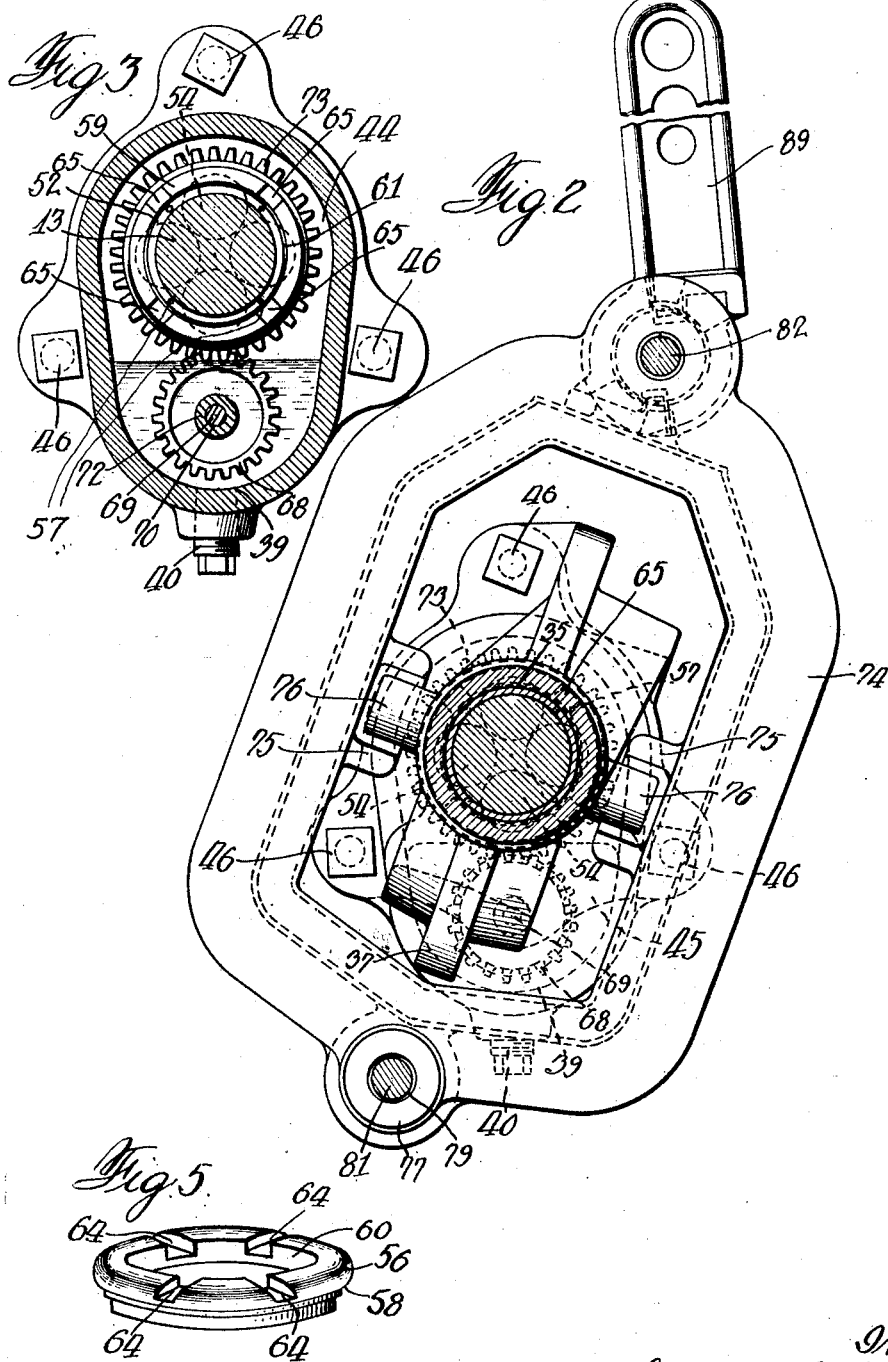
Inventor  
Ludwig Holland-Letz  
By Sprinkle & Smith  
Attys.

Patented Feb. 12, 1929.

1,701,535

UNITED STATES PATENT OFFICE.

LUDWIG HOLLAND-LETZ, OF CROWN POINT, INDIANA, ASSIGNOR TO THE LETZ MANUFACTURING COMPANY, A CORPORATION OF INDIANA.

LUBRICATING DEVICE FOR BEARINGS.

Application filed April 10, 1924. Serial No. 705,418.

My invention relates to lubricating device and particularly to means for automatically lubricating a bearing.

One of the objects of the present invention is to provide an improved and simplified form of an automatically actuated lubricating device.

A further object of the invention is to provide a novel construction of an anti-friction bearing in which the ball bearing retaining ring is operatively connected with means for lubricating the bearing.

A further object of the invention is to provide an improved form of lubricating device for a bearing in which the excess lubricant supplied to the bearing is automatically returned to the lubricating supply chamber.

A further object of the invention is to provide an improved end thrust bearing for a shaft which can be easily and quickly assembled in the manufacture thereof.

A still further object of the invention is to provide an improved form of self aligning bearing in connection with my improved lubricating device.

These and other objects are accomplished by providing a construction and arrangement of the various parts in the manner hereinafter described and particularly pointed out in the appended claims.

Referring to the drawings, Fig. 1 is a longitudinal vertical view partly in section of a portion of a feed mill showing my improved lubricating device and bearing mounted therein.

Fig. 2 is a cross sectional view taken on the lines 2—2 in Fig. 1 and looking in the direction indicated by the arrows.

Fig. 3 is a cross sectional view taken on the lines 3—3 in Fig. 1 looking in the direction indicated by the arrows.

Fig. 4 is a perspective view of one of the ball bearing races, and

Fig. 5 is a perspective view of my improved form of ball bearing retaining rings.

For the purpose of illustration I have shown my improved lubricating device and bearing in connection with a feed mill, but it will be understood that the herein described invention may be used in connection with various other types of machines. The grinding mill showing the improvement comprises a buhr casing 10 which is secured to the frame of the mill in any well known manner and is provided with a centrally disposed opening 11 which is adapted to have extending therethrough a feeding member 12 and shaft 13 to which the feeding member is secured. The buhr casing 10 is provided with a peripheral flange 14 forming a housing for the grinding buhrs of the mill. Formed integrally with the flange 14 of the casing 10 at regularly spaced intervals about the periphery thereof are a plurality of bosses 15, only one of which is shown, having longitudinal apertures 16 extending therethrough. Extending through the apertures 16 of the bosses 15 are bolts 17, which secure corresponding bosses 18 of the cap or cover 19 to the buhr casing 10. The cover 19 is provided with a recess 20 which intermeshes with a corresponding rib 21 of the flange 14 and thereby insures a firmly secured housing for the grinding buhrs. Mounted in the buhr casing 10 and preferably on horizontal pivots, not shown, is a buhr holder ring 22. Pivotally mounted by means of vertical pins 23 is a rocking plate holder 24. Secured to the plate holder 24 by means of bolts, not shown, is the usual relatively stationary buhr 25. Positioned opposite the buhr 25 is the rotating buhr 26 which is secured by means of bolts 27 to the rotating buhr holder 28, which, in turn, is secured to the shaft 13 by means of a pin 29. The construction of grinding mill above described is well known in the art and per se forms no part of the present invention, and for this reason it is thought unnecessary to describe the same in more detail.

In the type of machine above described it will be understood that when the machine is run at a relatively high capacity the end thrust on the shaft by reason of the grain being ground between the grinding buhrs is considerable, and it has been difficult to design a bearing and a lubricating device which will meet the requirement of the tremendous wear on a bearing positioned at the end of the shaft. One of the important features of my invention is the provision of a lubricating device and bearing construction in which the lubricant is automatically supplied to the bearing and all excess lubricant supplied to the bearing is returned to the lubricating supply chamber.

This improved lubricating device and bearing comprises an adjustable bearing bracket 30 having a relatively enlarged bearing portion 31 having a relatively reduced bearing portion 32 formed integrally therewith. The bearing portion 32 of the adjustable bearing bracket 30 is preferably machined and adapted to be slidingly adjusted in a centrally disposed bore 33 in a boss 34 of the cap or cover 19 of the mill, and the bearing portions 31 and 32 of the adjustable bracket 30 are provided with a soft metal bushing 35 in which the shaft 13 rotates. The bearing bracket 30 is provided with longitudinally extending offset arms 36 and 37. Formed integrally with the arms 36 and 37 of the bracket 30 is a bearing portion 38 which forms a bearing for the extreme outer end of the shaft 13. Formed integrally with the arms 36 and 37 of the bracket 30 and immediately below the bearing portion 38 is a lubricant supply chamber 39 which is provided with a drain plug 40. The bearing portion 38 of the bracket 30 is provided with, adjacent its inner end, a peripheral groove 41 for the purpose hereinafter set forth. The groove 41 of the bearing portion 38 communicates with the lubricant supply chamber 39 by an aperture 42 formed in the bottom of the bearing portion 38. The outer end of the bearing portion 38 is provided with a cylindrical recess portion as shown at 43, of a diameter relatively larger than the diameter of the shaft 13. The adjustable bearing bracket 30 is recessed, as shown at 44, just beyond the outer end of the bearing portion 38 to form a compartment for encasing my improved lubricating device and bearing construction. The casing or housing for my improved lubricating and bearing construction is provided with an end thrust member or plate 45, which is secured to the adjustable bearing bracket 30 by three bolts 46, as clearly shown in Figs. 1, 2 and 3. The end thrust plate is provided with an inclined passageway 47, which leads to the lubricant chamber 39 for filling and viewing the level of the lubricant. The passageway 47 is provided with the usual filling plug 48. The end thrust plate 45 has formed on its inner side an inwardly projecting annular rib 49 forming a cylindrical recess 50 centrally of the plate. The cylindrical recess 50 of the plate 45 corresponds with the cylindrical recess 43 formed in the bearing portion 38 of the bearing bracket 30, both of which are adapted to receive ball bearing races 51 and 52, respectively. The ball bearing races 51 and 52 are provided with the usual circular tracks 53 which define the path in which the ball bearings revolve. The ball bearings 54, of which there are four, in number, are mounted in ball retaining rings 55 and 56 which are constructed in a manner to support the balls in relatively spaced relation with respect to each other and are secured together by rivets 57. Each of the ball retaining rings 55 and 56 is provided on its outer side with annular flanges 58 and 59, and thereby form cylindrical recesses 60 and 61. The cylindrical recesses 60 and 61 of the ball bearing retaining rings 56 and 55, respectively, are adapted to receive the inner faces of the ball races 51 and 52, as clearly shown in Fig. 1 of the drawings. In the construction of the ball retaining rings 55 and 56 and the recesses 60 and 61 formed therein, sufficient space between these recesses and the ball races 51 and 52, as shown at 62 and 63, has been provided to permit the lubricant which is sprayed by the lubricating device or carried by the revolving ball bearing retaining rings to flow into these spaces 62 and 63 and lubricate the bearing.

It will also be noted by referring to Fig. 1 that the annular flange 58 as well as the annular flange 59 of the ball retaining rings 56 and 55, respectively, are sufficiently spaced from either side of the casing to permit the lubricant to be supplied to the bearing.

In order to additionally assist the lubricant to reach the bearing I have provided cut away portions as shown at 64 and 65 in each of the annular ribs 58 and 59 of the ball bearing retaining rings 56 and 55, respectively. These cut away portions are arranged at intervals about the peripheries of these ribs and thereby insure the proper supply of lubricant to the bearing. The shaft 13 is provided with, adjacent its outer end, two peripheral grooves as shown at 66, forming a peripheral flange therebetween, as shown at 67. This flange 67 and grooves 66 are arranged to rotate adjacent the groove 41 formed in the bearing portion 38 of the bearing bracket 30 and when there is any excess lubricant supplied through the space formed between the ball bearing race 52 and the cylindrical chamber 43 it will pass inwardly on the shaft and be discharged by the peripheral flange 67 into the groove 41 formed in the bearing portion 38, from whence it will be discharged through the opening 42 back to the lubricant supply chamber 39. In order to properly supply the lubricant to my improved bearing construction I have provided a lubricant spray wheel in the form of a rotating gear as shown at 68, which is mounted on a pin 69 seated in bearings 70 and 71, respectively, on the opposite sides of the lubricant chamber 39. The gear 68 is provided with a relatively long hub as shown at 72 and is adapted to contact with the opposite sides of the lubricating chamber 39 in preventing its displacement therefrom. The gear 68 is operatively driven for spraying the lubricant on the bearing by meshing with gear teeth 73 formed integrally with the ball retaining ring 55.

From the above description it will be readily seen that when the lubricant is at a level as indicated at A in the chamber 39 the gear wheel 68 will be practically submerged and when the shaft 13 is operatively driven at a high rate of speed the oil will be sprayed by the gear 68 on to the gear teeth 73, annular flanges 58 and 59 of the bearing ball retaining rings 56 and 55, and on the walls of the bearing compartment 44 where it will pass into all openings surrounding the bearing and through the cut away portions 64 and 65 of the ball bearing retaining rings 56 and 55, respectively, from where it will be supplied to the ball bearings and races 51 and 52.

It will be further noted from the above description that my improved lubricating device and bearing construction can easily and quickly be assembled by positioning the hub 72 of the gear 68 in registering alignment with the bearing apertures 70 and 71 of the lubricant chamber 39 and inserting the pin 69. Then by positioning the ball race 52 in the cylindrical recess 43 of the bearing portion 38 and positioning the ball bearings together with their retaining rings 55 and 56 in operative relation with the gear wheel 68 with the bearing balls in the race way of the ball race 52 and then positioning the ball race 51 in the recess 50 of the cover plate 45 the plate can be secured by bolts 46 to the bearing bracket 30. By this arrangement it will readily be seen that I have provided a construction which is easily and quickly assembled. The self aligning adjustable bearing bracket 30 is supported in its position by a yoke member 74 which surrounds the bearing bracket 30 adjacent the bearing portion 31 thereof and is provided with semi-circular lugs 75 which are positioned on the opposite sides thereof and adapted to engage oppositely disposed pins 76 which are formed integrally with the bearing portion 31 of the adjustable bearing bracket 30. By this construction it will be noted that the yoke 74 is fulcrumed by means of these semi-circular lugs 75 to the adjustable bearing bracket and adjustably retains the same against longitudinal movement in a direction outwardly from the grinding mill. The yoke 74 is provided adjacent its upper and lower ends with bosses 77 and 78, which, in turn, are provided with longitudinally extending apertures 79 and 80 respectively. Extending through the apertures 79 and 80 of the bosses 77 and 78, respectively, are studs 81 and 82 which have their inner ends secured by means of threaded engagement to the bosses 83 and 84 formed integrally with the cap or cover 19. The studs 81 and 82 are secured in the bosses 83 and 84 of the cover 19 by lock nuts 85. The bearing bracket 30 is resiliently supported against an end thrust by the provision of a compression spring 86 mounted on the stud 81 and having one end seated in a shallow socket 87 formed on the outer side of the boss 77 of the yoke member 74 and its other end adjustably retained in position by a nut and washer 88.

If for any reason it becomes necessary to separate the grinding buhrs 25 and 26, as for example should a piece of steel become lodged between the grinding buhrs, the rotating buhr 26 may be moved longitudinally of its axis with respect to the relatively stationary buhr 25 by oscillating a crank handle 89 journalled on the stud 82 and having oppositely disposed camming surfaces 90, which co-act with corresponding cam surfaces 91 formed on the outer side of and adjacent the boss 78 of the yoke 74. The crank handle 89 is adapted to be adjusted longitudinally on the stud 82 by a hand wheel 92, which is in threaded engagement with the stud 82 and is locked in predetermined positions of adjustment by a locking turn screw 93. From the above description it will be readily seen that as the crank handle 89 is oscillated in a direction to cause the camming surfaces to advance toward one another the yoke member 74 and particularly the upper end thereof will swing outwardly with respect to the mill about the boss 77 on the stud 81 as a center. Lock nuts 94 are provided to prevent the compression spring 86 from forcing the lower end of the yoke member 74 toward the mill when the crank handle is oscillated to permit the yoke member to swing outwardly so as to relieve the adjustable bearing bracket 30 to move longitudinally in a direction outwardly from the mill and thereby permit the rotating buhrs to separate.

It will thus be apparent from the above description that by slidingly and adjustably mounting the bearing portion 32 of the adjustable bearing bracket 30 in the bore 33 of the cover plate 19 and by adjustably supporting the bearing bracket 30 by the fulcrum yoke 74 that I have provided a novel and improved means of a self aligning and an adjustable bearing bracket which can be readily manipulated to permit the adjustable bearing bracket as well as the shaft carried thereby to be moved longitudinally in separating the rotating buhr of the mill.

While in the above specification I have described one embodiment which my invention may assume in practice, it will be understood that the same is capable of modification and that modification may be made without departing from the spirit and scope of the invention as expressed in the following claims.

What I claim as my invention and desire to secure by Letters Patent is:

1. In a lubricating device, the combination with a shaft of a bearing for said shaft, an anti-friction end thrust bearing associated with said first mentioned bearing and said shaft, and a gear wheel partially submerged in a lubricant and operatively connected with said anti-friction bearing for supplying lubricant to said bearing.

2. In a lubricating device, the combination with a shaft, of a bearing for said shaft, an anti-friction bearing associated with said first mentioned bearing and said shaft, said anti-friction bearing comprising a plurality of bearing balls and a retaining ring therefor, and means operatively driven by said retaining ring for supplying a lubricant to said bearing.

3. In a lubricating device, the combination with a shaft, of a bearing for said shaft, an anti-friction bearing associated with said first mentioned bearing and said shaft, said anti-friction bearing comprising a plurality of bearing balls and a retaining ring therefor, and a rotatable lubricating spray wheel operatively related to said retaining ring for supplying a lubricant to said bearing.

4. In a lubricating device, the combination with a shaft, of a bearing for said shaft, an end thrust anti-friction bearing associated with said first mentioned bearing and said shaft, said anti-friction bearing comprising a plurality of bearing balls and a retaining ring therefor, said retaining ring operated in connection with a lubricating spray wheel in the form of a gear meshing with the teeth on said ring for spraying a lubricant to said bearing.

5. In a lubricating device, the combination with a shaft of an adjustable bearing bracket for supporting one end of said shaft, an anti-friction bearing mounted in said bracket and operatively related to said shaft, a lubricant supply chamber formed integrally with said bracket, a lubricating spraying wheel operatively related with said anti-friction bearing and positioned in said lubricant supply chamber for spraying a lubricant on said anti-friction bearing and on the bearing for said shaft.

6. In a lubricating device, the combination with a shaft, of an adjustable bearing bracket for supporting one end of said shaft, an anti-friction bearing mounted in said bracket and operatively related to said shaft, said anti-friction bearing comprising a plurality of bearing balls and retaining rings therefor, one of said retaining rings being provided with gear teeth, a lubricant supply chamber formed integrally with said bracket, a lubricating spray wheel having teeth meshing with the teeth in the retaining ring and positioned in said supply chamber for spraying a lubricant on said anti-friction bearing and on the bearing for said shaft.

7. In a lubricating device, the combination with a shaft, of an adjustable self-aligning bearing bracket for supporting one end of said shaft, there being a circular recess formed in the end of said bearing bracket adjacent the end of said shaft, a ball bearing race positioned in said recess, a removable plate secured to said bracket and having a circular recess adapted to receive a ball bearing race, an anti-friction bearing comprising a plurality of bearing balls and retaining rings positioned between said ball bearing races, a lubricant supply chamber formed integrally with said bracket and positioned below said anti-friction bearing, and a lubricating spray wheel operatively related to said anti-friction bearing and positioned in said lubricant supply chamber for supplying a lubricant to said anti-friction bearing and to the bearing for said shaft.

8. In a lubricating device, the combination with a shaft, of an adjustable self-aligning bearing bracket for supporting one end of said shaft, there being a circular recess formed in the end of said bearing bracket adjacent the end of said shaft, a ball bearing race positioned in said recess, a removable plate secured to said bracket and having a circular recess adapted to receive a ball bearing race, an anti-friction bearing comprising a plurality of bearing balls and retaining rings positioned between said ball bearing races, one of said ball retaining rings being provided with gear teeth, a lubricant supply chamber formed integrally with said bracket and positioned below said anti-friction bearing, and a lubricating spray wheel positioned in said lubricant supply chamber and having gear teeth meshing with the gear teeth on said retaining ring for supplying a lubricant to said anti-friction bearing and to the bearing for said shaft.

9. In a lubricating device, the combination with a shaft, of an adjustable self-aligning bearing bracket for supporting one end of said shaft, there being a circular recess formed in the end of said bearing bracket adjacent the end of said shaft, a ball bearing race positioned in said recess, a removable plate secured to said bracket and having a circular recess adapted to receive a ball bearing race, an anti-friction bearing comprising a plurality of bearing balls and retaining rings positioned between said ball bearing races and means operatively related to said retaining rings for supplying lubricant to said bearing.

10. In a lubricating device, the combination with a shaft of a bearing for said shaft, an anti-friction bearing comprising a retaining ring and bearing balls associated with said first mentioned bearing and said shaft and means partially submerged in the lubricant and operatively driven by said retaining ring for supplying a lubricant to said bearing.

11. In a lubricating device the combination with a shaft of a bearing for said shaft, an anti-friction bearing comprising a retaining ring and bearing balls associated with said first mentioned bearing and said shaft, a lubricant elevating means operatively driven by said retaining ring for delivering a lubricant to the bearing of said shaft.

In testimony whereof I have signed my name to this specification, on this 31st day of March, A. D. 1924.

LUDWIG HOLLAND-LETZ.